(12) United States Patent
Dolgin et al.

(10) Patent No.: US 10,686,533 B2
(45) Date of Patent: Jun. 16, 2020

(54) BALANCED OPTICAL RECEIVERS AND METHODS FOR DETECTING OPTICAL COMMUNICATION SIGNALS

(71) Applicant: RAYTHEON COMPANY, Waltham, MA (US)

(72) Inventors: Benjamin P. Dolgin, Alexandria, VA (US); Gary M. Graceffo, Burke, VA (US); Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/367,567

(22) Filed: Mar. 28, 2019

(65) Prior Publication Data
US 2019/0305855 A1    Oct. 3, 2019

Related U.S. Application Data

(60) Provisional application No. 62/649,209, filed on Mar. 28, 2018.

(51) Int. Cl.
*H04B 10/06* (2006.01)
*H04B 10/69* (2013.01)
(Continued)

(52) U.S. Cl.
CPC .............. *H04B 10/69* (2013.01); *H04B 10/25* (2013.01); *H04B 10/54* (2013.01); *H04B 10/676* (2013.01)

(58) Field of Classification Search
CPC ........ H04B 10/69; H04B 10/25; H04B 10/54; H04B 10/548; H04B 10/564; H04B 10/60;
(Continued)

(56) References Cited

U.S. PATENT DOCUMENTS 6,243,200 B1    6/2001   Zhou et al.
7,738,798 B2 *  6/2010   Mayer .................. H04B 10/677
                                              398/212
(Continued)

FOREIGN PATENT DOCUMENTS

EP         1686707 A2     8/2006

OTHER PUBLICATIONS

Merimaa et al. "Portable laser frequency standard at 633 nm with compact external-cavity diode laser", Metrologia (2001) vol. 38, pp. 311-318.
(Continued)

*Primary Examiner* — Hibret A Woldekidan
(74) *Attorney, Agent, or Firm* — Lando & Anastasi, LLP

(57) ABSTRACT

Optical receivers and methods for balanced signal detection using an optical resonator. In one example, an optical receiver includes an optical resonator that receives an optical signal, accumulates resonant optical signal energy, and emits first output optical signal energy from a first output and second output optical signal energy from the second output. In response to a modulation of the optical signal, the optical resonator is configured to disrupt the first and second output optical signal energies to convert the modulation of the optical signal into an intensity modulation of the first and second output optical signal energies. The optical receiver includes a first detector that receives the first output optical signal energy and detects the intensity modulation of the first output optical signal energy, and a second detector that receives the second output optical signal energy and detects the intensity modulation of the second output optical signal energy.

18 Claims, 4 Drawing Sheets

(51) Int. Cl.
*H04B 10/25* (2013.01)
*H04B 10/54* (2013.01)
*H04B 10/67* (2013.01)

(58) Field of Classification Search
CPC ...... H04B 1/7115; H04B 10/67; H04B 10/66; H01S 3/08; G02B 5/284; G02B 6/29338; G01C 19/727
USPC ....... 398/116, 176, 202, 211, 207, 214, 186, 398/187, 188, 141, 205
See application file for complete search history.

(56) References Cited

U.S. PATENT DOCUMENTS

| | | | |
|---|---|---|---|
| 8,554,085 B1* | 10/2013 | Yap | G02F 2/02 398/183 |
| 8,908,187 B2 | 12/2014 | Strandjord et al. | |
| 9,018,575 B2 | 4/2015 | Kowalevicz et al. | |
| 9,115,994 B2* | 8/2015 | Strandjord | G01C 19/721 |
| 9,165,963 B2 | 10/2015 | Kowalevicz et al. | |
| 9,171,219 B2 | 10/2015 | Kowalevicz | |
| 9,400,414 B2 | 7/2016 | Kowalevicz | |
| 9,503,660 B2 | 11/2016 | Kowalevicz et al. | |
| 9,535,245 B1 | 1/2017 | Kowalevicz | |
| 9,684,127 B2* | 6/2017 | Qi | G02B 6/12007 |
| 9,823,075 B2 | 11/2017 | Yao | |
| 9,876,580 B2* | 1/2018 | Yuan | H04B 10/70 |
| 9,887,779 B2 | 2/2018 | Kowalevicz | |
| 9,905,999 B2* | 2/2018 | Li | H01S 3/0627 |
| 9,973,281 B2 | 5/2018 | Kowalevicz et al. | |
| 10,164,765 B2 | 12/2018 | Dolgin et al. | |
| 10,177,856 B2 | 1/2019 | Kowalevicz et al. | |
| 10,205,526 B2 | 2/2019 | Kowalevicz | |
| 10,225,020 B2 | 3/2019 | Dolgin et al. | |
| 10,243,670 B2 | 3/2019 | Kowalevicz et al. | |
| 10,243,673 B2* | 3/2019 | Dolgin | H04B 10/67 |
| 10,250,292 B2 | 4/2019 | Graceffo et al. | |
| 10,256,917 B2 | 4/2019 | Dolgin et al. | |
| 10,305,602 B2* | 5/2019 | Dolgin | H04B 10/676 |
| 10,313,022 B2 | 6/2019 | Dolgin et al. | |
| 10,415,971 B2 | 9/2019 | Krueger et al. | |
| 2005/0225775 A1* | 10/2005 | Brunfeld | G01N 21/211 356/519 |
| 2005/0265728 A1 | 12/2005 | Yao | |
| 2006/0013591 A1* | 1/2006 | Rohde | H04B 10/675 398/152 |
| 2006/0023987 A1 | 2/2006 | Yao | |
| 2008/0054160 A1 | 3/2008 | Yao | |
| 2008/0079947 A1 | 4/2008 | Sanders et al. | |
| 2008/0226300 A1 | 9/2008 | Mayer et al. | |
| 2008/0310789 A1 | 12/2008 | Mihailov et al. | |
| 2010/0073681 A1 | 3/2010 | Qiu et al. | |
| 2012/0307253 A1 | 12/2012 | Sanders et al. | |
| 2014/0369699 A1* | 12/2014 | Strandjord | G01C 19/721 398/187 |
| 2015/0236784 A1* | 8/2015 | Vahala | H03L 7/08 398/115 |
| 2015/0241278 A1* | 8/2015 | Holczer | G01B 11/14 356/519 |
| 2016/0047655 A1 | 2/2016 | Qiu et al. | |
| 2016/0116288 A1 | 4/2016 | Song et al. | |
| 2016/0352515 A1* | 12/2016 | Bunandar | H04L 9/0852 |
| 2017/0346564 A1 | 11/2017 | Wiswell | |
| 2018/0054259 A1* | 2/2018 | Kowalevicz | H04B 10/67 |
| 2018/0091227 A1 | 3/2018 | Dolgin et al. | |
| 2018/0091228 A1 | 3/2018 | Kowalevicz et al. | |
| 2018/0091230 A1 | 3/2018 | Dolgin et al. | |
| 2018/0091232 A1 | 3/2018 | Dolgin et al. | |
| 2018/0102853 A1 | 4/2018 | Dolgin et al. | |
| 2018/0145765 A1 | 5/2018 | Kowalevicz et al. | |
| 2018/0167145 A1 | 6/2018 | Dolgin et al. | |
| 2018/0234231 A1 | 8/2018 | Dolgin et al. | |
| 2018/0270010 A1 | 9/2018 | Troeltzsch et al. | |
| 2018/0313642 A1 | 11/2018 | Dolgin et al. | |
| 2018/0367223 A1 | 12/2018 | Graceffo et al. | |
| 2018/0372517 A1 | 12/2018 | Yao et al. | |
| 2019/0007091 A1 | 1/2019 | Graceffo et al. | |
| 2019/0017824 A1* | 1/2019 | Qiu | G01C 19/662 |
| 2019/0158208 A1 | 5/2019 | Dolgin et al. | |
| 2019/0219396 A1 | 7/2019 | Krueger et al. | |

OTHER PUBLICATIONS

"Application Note: Variable Attenuator for Lasers", Technology and Applications Center, Newport Corporation (2006).

* cited by examiner

BALANCED OPTICAL RECEIVERS AND METHODS FOR DETECTING OPTICAL COMMUNICATION SIGNALS

CROSS-REFERENCE TO RELATED APPLICATIONS

This application claims the benefits under 35 U.S.C. § 119(e) and PCT Article 8 of U.S. Provisional Application No. 62/649,209 filed on Mar. 28, 2018 and titled "BALANCED OPTICAL RECEIVERS AND METHOD FOR DETECTING OPTICAL COMMUNICATION SIGNALS," which is herein incorporated by reference in its entirety for all purposes.

BACKGROUND

Many optical communication systems manipulate light waves to carry information. For instance, often a light source (e.g., a laser source) is modulated to change one or more properties of emitted light, such as an amplitude, phase, or frequency, to convey information. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, from which the underlying signal and the information may be recovered.

SUMMARY OF INVENTION

Aspects and embodiments are directed to methods and apparatus for balanced detection of optical signals in an optical receiver using one or more optical resonators for modulation conversion.

According to one embodiment, an optical receiver comprises an optical resonator having first and second outputs and configured to receive an optical signal, to accumulate resonant optical signal energy, and to emit first output optical signal energy from the first output and second output optical signal energy from the second output, wherein in response to a variation in the received optical signal corresponding to a modulation of the optical signal, the optical resonator is configured to disrupt the first output optical signal energy and the second output optical signal energy to convert the modulation of the optical signal into an intensity modulation of the first output optical signal energy and the second output optical signal energy. The optical receiver further comprises a first detector positioned to receive the first output optical signal energy and detect the intensity modulation of the first output optical signal energy, and a second detector positioned to receive the second output optical signal energy and detect the intensity modulation of the second output optical signal energy.

In one example, the optical receiver further comprises a circulator positioned to direct the optical signal along an input path to the optical resonator, the circulator being further positioned and configured to receive the second output optical signal energy from the optical resonator along the input path in a direction opposite to propagation of the optical signal and to direct the second output optical signal energy to the second detector. In one example, the circulator is an optical fiber circulator and the input path is an optical fiber.

The optical signal may be a frequency-modulated optical signal, a phase-modulated optical signal, or an amplitude-modulated optical signal, and the variation may correspond to a respective frequency, phase, or amplitude change in the optical signal.

In one example, the optical resonator includes a first semi-reflective surface and a second semi-reflective surface configured to accumulate the resonant optical signal energy by reflecting at least a portion of the optical signal between the first and second semi-reflective surfaces. In one example, the first output is the first semi-reflective surface and the second output is the second semi-reflective surface.

The optical receiver may further comprise a third detector, and a first beamsplitter interposed between the first output and the first detector and between the first output and the third detector. The first beamsplitter is configured to split the first output optical signal energy into a first portion and a second portion, and wherein the first beamsplitter is configured to direct the first portion of the first output optical signal energy to the first detector and direct the second portion of the first output optical signal energy to the third detector. The optical receiver may further comprise a fourth detector and a second beamsplitter interposed between the second output and the second detector and between the second output and the fourth detector. The second beamsplitter is configured to split the second output optical signal energy into a first portion and a second portion, and wherein the second beamsplitter is configured to direct the first portion of the second output optical signal energy to the second detector and direct the second portion of the second output optical signal energy to the fourth detector. In one example, the optical receiver further comprises a circulator positioned to direct the optical signal along an input path to the optical resonator, the circulator being further positioned and configured to receive the second output optical signal energy from the optical resonator and to direct the second output optical signal energy to the second beamsplitter. In one example, the first and/or second beamsplitters are polarizing beamsplitters. For example, the first portion of the first output optical signal energy may have a first polarization, and the second portion of the first output optical signal energy may have a second polarization orthogonal to the first polarization. Similarly, the first portion of the second output optical signal energy may have the first polarization, and the second portion of the second output optical signal energy may have the second polarization.

In one example, the first detector is configured to use an average value of the second output optical signal energy as a trigger threshold for detection of the intensity modulation of the first output optical signal energy. An average value of the first output optical signal energy may alternatively be used by the second detector as a trigger threshold for detection of the intensity modulation of the second optical signal.

According to another embodiment, a method of operating an optical signal receiver comprises receiving an optical signal at an optical resonator, accumulating resonant optical signal energy within the optical resonator, emitting first output optical signal energy from a first output of the optical resonator, emitting second output optical signal energy from a second output of the optical resonator, in response to a variation in the received optical signal corresponding to a modulation of the optical signal, disrupting the first output optical signal energy and the second output optical signal energy to convert the modulation of the optical signal into an intensity modulation of the first output optical signal energy and the second output optical signal energy, receiving the first output optical signal energy at a first detector, and detecting the intensity modulation of the first output optical signal energy, and receiving the second output optical signal energy at a second detector, and detecting the intensity modulation of the second output optical signal energy.

The method may further include using an average value of either of the first output optical signal energy or the second output optical signal energy as a trigger threshold for detection of the intensity modulation of the other of the first and second output optical signal energies.

In one example, the method further comprises directing the optical signal along an input path to the optical resonator with a circulator, receiving the second output optical signal energy from the optical resonator at the circulator along the input path in a direction opposite to propagation of the optical signal, and directing the second output optical signal energy to the second detector with the circulator.

In another example, accumulating the resonant optical signal energy within the optical resonator includes reflecting at least a portion of the optical signal between a first semi-reflective surface and a second semi-reflective surface.

In another example, the method further comprises at a first beamsplitter, splitting the first output optical signal energy into a first portion and a second portion, directing the first portion of the first output optical signal energy to the first detector, and directing the second portion of the first output optical signal energy to a third detector. In one example, the first beamsplitter is a polarizing beamsplitter, the first portion of the first output optical signal has a first polarization, and the second portion of the first output optical signal energy has a second polarization orthogonal to the first polarization. In another example, the method further comprises at a second beamsplitter, splitting the second output optical signal energy into a first portion and a second portion, directing the first portion of the second output optical signal energy to the second detector, and directing the second portion of the second output optical signal energy to a fourth detector. In one example, the second beamsplitter is a polarizing beamsplitter, the first portion of the second output optical signal has the first polarization, and the second portion of the second output optical signal energy has the second polarization. The method may further comprise directing the optical signal along an input path to the optical resonator with a circulator, receiving the second output optical signal energy from the optical resonator at the circulator, and directing the second output optical signal energy to the second beamsplitter with the circulator.

In various examples of the method, the optical signal is one of a phase-modulated optical signal, a frequency-modulated optical signal, and an amplitude-modulated optical signal, and wherein the variation corresponds to a respective phase change, frequency change, or amplitude change in the optical signal.

Still other aspects, embodiments, and advantages of these exemplary aspects and examples are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and examples described herein may also include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
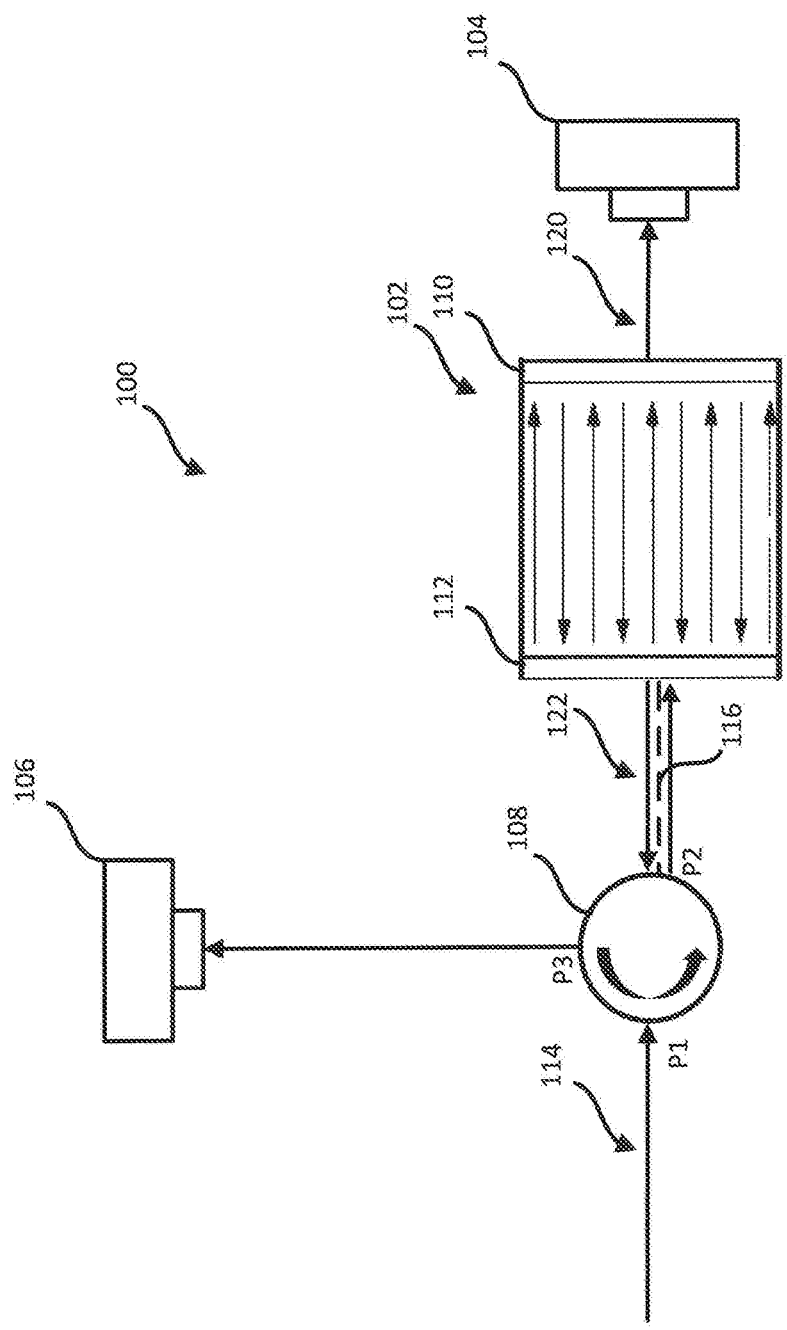
FIG. 1 is a diagram of one example of an optical receiver according to aspects of the present invention.

Various aspects and examples described herein are directed to balanced optical signal receivers and methods for demodulating an optical signal without a locally coherent clock source. In certain examples, the described optical receivers include an optical resonator, such as a Fabry-Perot resonator, that is configured to convert an encoded optical signal into an intensity-encoded output. In particular, the optical resonator may be configured to accumulate resonant optical signal energy therein and transmit output optical signal energy from a first output. In response to a variation (e.g., a phase, frequency, and/or amplitude modulation) in the received optical signal, the received optical signal disrupts the optical resonance within the optical resonator and causes a disruption in the transmitted output optical signal energy. The variation in the received optical signal further causes the optical resonator to reject (also sometimes referred to as reflect) second output optical signal energy from a second output until resonance is re-established within the optical resonator.

Accordingly, in various examples, the optical receivers described herein include a plurality of detectors, at least one detector for the transmitted output optical signal energy and at least one detector for the rejected output optical signal energy. Balanced detection of the transmitted output optical signal energy and the rejected output optical signal energy improves the sensitivity of the optical signal receiver when compared to single sensing resonator output techniques. In some instances, balanced detection, as discussed herein, may result in a 3 dB (or more) sensitivity improvement relative to single sensing resonator output techniques. As used herein the term "balanced" detection or detecting is intended to refer to an approach where one or more detectors are used to detect both the transmitted output optical signal energy and the rejected output optical signal energy and is not intended to be limiting with respect to any characteristics of the transmitted output optical signal energy and the rejected output optical signal energy. The transmitted output optical signal energy and the rejection output optical signal are not necessarily equal in amplitude or shape and opposite in sign. The transmitted output optical signal energy and the rejected output optical signal energy may have similar or differing envelope shapes and may have similar of differing amplitudes and/or phase.

It is to be appreciated that embodiments of the apparatuses and methods discussed herein are not limited in application to the details of construction and the arrangement of components set forth in the following description or illustrated in the accompanying drawings. The apparatuses and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present apparatuses and methods or their components to any one positional or spatial orientation.

FIG. 1 illustrates one example of an optical receiver 100 according to various examples described herein. As illustrated, the optical receiver 100 may include an optical resonator 102 having more than one output, and at least one detector. In particular, FIG. 1 shows the optical receiver 100 including two detectors 104, 106. As further illustrated, the optical receiver 100 may include an optical 108. In some examples, the circulator 108 is an optical fiber circulator. The circulator 108 is positioned to receive an optical signal (represented by arrow 114) and direct the optical signal to the optical resonator 102. For instance, the circulator 108 may receive an optical signal via a first fiber coupling and direct the optical signal to the optical resonator 102 along an input path 116 via a second fiber coupling. While primarily described herein as an optical signal (e.g., consisting of non-ionizing electromagnetic radiation), in various other examples, the received signal may instead be a radio-frequency signal, or other communication signal.

The optical resonator 102 is positioned to receive the optical signal from the circulator 108 along the input path 116. In various examples, the optical resonator 102 is an optical component capable of sensing variations, such as phase variations, amplitude variations, or frequency variations in the received optical signal. In particular, the optical resonator 102 is configured to transform the variations in the optical signal into an intensity modulation of transmitted output optical signal energy (also described herein as the first output optical signal energy), and/or an intensity modulation of rejected output optical signal energy (also described herein as the second output optical signal energy). In particular, the optical resonator 102 is configured to accumulate resonant optical signal energy within the optical resonator 102 and convert the modulation (e.g., phase, frequency, or amplitude modulation) of the received optical signal to an intensity modulation of the first and/or second output optical signal energy, in part, by interaction of the received optical signal with resonating optical signal energy within the optical resonator 102.

When a steady-state resonance condition is established within optical resonator 102, the transmitted output optical signal energy (represented by arrow 120) and the rejected output optical signal energy (represented by arrow 122) are emitted from the optical resonator 102 at respective steady intensities. When a variation occurs in the arriving optical signal, temporarily disrupting the steady-state, the intensities of the transmitted output optical signal energy and the rejected output optical signal energy are disrupted. During successive reflections of the received optical signal inside the optical resonator 102, resonance is re-established and the intensities of the transmitted output optical signal energy and the rejected output optical signal energy return to their steady-state levels. In some examples, the intensity of the transmitted output optical signal energy increases and at the same time the intensity of the rejected output optical signal energy decreases during successive reflections of the received optical signal energy inside the optical resonator 102 until steady intensities emerge when the optical resonator 102 has returned to the steady-state condition. However, in other examples, as the resonance condition is being reestablished, the intensity of the transmitted output optical signal energy decreases and the intensity of the rejected output optical signal energy increases until the steady-state values are reached. In one example, the steady-state may correspond to zero reflection (or rejection) and unity transmission, or vice versa; however, in other examples, in the steady-state both the transmitted output optical signal energy 120 and the rejected output optical signal energy 122 may have non-zero intensity values that may be the same or different from one another.

While shown as an etalon, in other examples, the optical resonator 102 may be a micro-ring or other resonant structure. That is, examples of the optical resonators described herein are not limited to the particular arrangement illustrated in FIG. 1. For instance, in one example the optical resonator 102 may instead be a micro-ring formed of one or more waveguides arranged as a closed loop such that optical signal energy traversing "around" the loop may be phase aligned with a dimension of the loop at one or more frequencies. Accordingly, optical signal energy traversing the loop may constructively interfere, at certain frequencies, to sustain the optical signal energy within the loop. At other frequencies, optical signal energy traversing the loop will interfere and thereby destroy, or reject, a build-up of optical signal energy at that frequency. The closed loop is also coupled to an input and output to allow light to enter the loop, e.g., an aperture, and to let light out of the loop.

According to certain examples, the optical resonator 102 coherently develops the transmitted output optical signal energy based on the received optical signal, and maintain a given level of the transmitted output optical signal energy until a variation (e.g., a phase, frequency, or amplitude change) of the received optical signal occurs. When a variation occurs in the received optical signal, interference causes a dependent change in the intensity (or amplitude) of the transmitted output optical signal energy. As discussed, in addition to the transmitted output optical signal energy, the optical resonator 102 may also emit rejected output optical signal energy. The rejected output optical signal energy is emitted from the optical resonator 102 in a direction opposite the transmitted output optical signal energy, and therefore, may also be described as being "reflected" by the optical resonator 102. When the variation occurs in the received optical signal, the interference within the optical resonator 102 also causes a dependent change in the intensity (or amplitude) of the rejected out optical signal energy. For instance, the variation may result in a decrease in the intensity of the transmitted output optical signal energy, and an increase in the intensity of the reflected output optical signal energy, or vice versa. Accordingly, a received phase-encoded (or frequency-encoded or amplitude-encoded) optical signal is converted to amplitude varying output signals by the optical resonator 102. The transmitted output optical signal energy is suitable for direct detection by a first detector, and the rejected output optical signal energy is suitable for direct detection by a second detector, such as the first and second detectors 104, 106 illustrated in FIG. 1.

As discussed, in various examples, the optical resonator 102 may be used to convert phase or frequency modulations of a received optical signal into intensity or amplitude modulations of the output optical signal energy. The intensity or amplitude modulated output optical signal energy may be converted to an electrical signal by detector including a photodetector (e.g., a photodetector of the first detector 104 or a photodetector of the second detector 106), with corresponding amplitude variations representative of the variation (e.g., phase transition) of the received optical signal. As illustrated in FIG. 1, in various examples, the optical resonator 102 is an etalon. That is, the optical resonator 102 may include a pair of parallel semi-reflective surfaces with an at least semi-transparent optical medium interposed there between. In various examples, the optical resonator 102 may include an interior (e.g., a cavity) that is defined by the pair of semi-reflective surfaces (e.g., shown as a first-semi reflective surface 110 and a second semi-reflective surface 112 in FIG. 1).

The first semi-reflective surface 110 is positioned in optical communication with the second semi-reflective surface 112. In FIG. 1, the first semi-reflective surface 110 is positioned substantially parallel and facing the second semi-reflective surface 112. As illustrated in FIG. 1, in various examples, each of the first and second semi-reflective surfaces 110, 112 are substantially planar. However, in other examples, other arrangements and surface curvatures may be used. An optical medium is positioned inside the optical resonator 102 and interposed between the first semi-reflective surface 110 and the second semi-reflective surface 102. In certain examples, the optical medium may be air or another dielectric material. In another example, the optical medium may be a vacuum.

The etalon may have one or more characteristic resonant frequencies, each associated with a certain wavelength of light, based upon the spacing (i.e., dimensional length) between the semi-reflective surfaces 110, 112. In some examples, the surfaces 110, 112 are semi-reflective and also semi-transmissive, in that they allow some light through. That is, in various examples, each semi-reflective surface 110, 112 may act as an input to allow ingress of the optical signal, while also acting as an output to allow emission of output optical signal energy. Accordingly, the arriving optical signal may be allowed into the optical resonator 102 (i.e., between the pair of semi-reflective surfaces 110, 112) and may resonate inside the optical resonator 102 and between the pair of semi-reflective surfaces 110, 112 before being emitted through each of the semi-reflective surfaces 110, 112.

In various examples, the optical resonator 102 emits first output optical signal energy, i.e., the transmitted output optical signal energy, from the first semi-reflective surface 110, and also emits second output optical signal energy, i.e., the rejected output optical signal energy, from the second semi-reflective surface 112. In the example in which the first and second semi-reflective surfaces 110, 112 define a resonant cavity, optical signal energy is emitted from both ends of the resonant cavity. As further described below, the output optical signal energy from each end of the optical cavity (e.g., the transmitted output optical signal energy and the rejected output optical signal energy) may be detected at a corresponding detector to provide a balanced detecting approach.

As described above, some of the resonating optical signal energy inside the optical resonator is emitted out of the optical resonator 102 through at least one of the semi-transmissive surfaces 110, 112. In various examples, one of the first semi-reflective surface 110 and the second semi-reflective surface 112 may form an entrance aperture (shown as the second semi-reflective surface 112 in FIG. 1) through which the optical signal is received from the circulator 108 and directed into the inside of the optical resonator 102. The first semi-reflective surface 110 acts as a first output from which the transmitted output optical signal energy is emitted, and the second semi-reflective surface 112 acts a second output from which the rejected output optical signal energy is emitted. That is, each of the first and second semi-reflective surfaces 110, 112 allow a portion of trapped resonating optical signal energy from the interior to emerge as an output optical signal.

As discussed, a change in phase, frequency, or amplitude of the arriving optical signal (e.g., corresponding to a symbol transition) causes a change in the intensity of the output optical signal energy (e.g., the first output optical signal energy and the second output optical signal energy). A large transition in the arriving optical signal, for example, causes a large (but temporary) intensity drop in the emerging transmitted output optical signal energy and also causes a large (but temporary) intensity increase in the emerging rejected output optical signal energy, or vice versa (i.e., a large, temporary increase in the intensity of the emerging transmitted output optical signal energy and a large, temporary decrease in the intensity of the emerging rejected output optical signal energy). Similar operation occurs in a microring or other optical resonator. Accordingly, in various examples, the optical resonator 102 functions as a modulation converter for the received optical signal. The emerging output optical signal energy may therefore carry the same information content as the arriving optical signal, but in an intensity modulated form.

The use of the term "etalon" throughout this disclosure is not intended to be limiting and as used herein may include any of multiple structures, including plates with reflecting surfaces as well as parallel mirrors with various materials positioned in-between, and in particular examples, with controllable optical materials positioned in-between. The spacing between the semi-reflective surfaces of an etalon may be referred to herein as a cavity, but is not so limited. That is, the resonant cavities may include other structures, such interferometers and the like. Additionally, etalon structures may be formed as a laminate, layer, film, coating, or the like.

In some examples, an etalon may include reflective surfaces (including semi-reflective surfaces) that are not co-planar and/or are not co-linear. For example, an interior reflective surface of the etalon may include some curvature, and an opposing surface may also be curved such that a distance between the two surfaces is substantially constant across various regions of the optical resonator, in some examples. In other examples, the etalon may have non-linear or non-planar surfaces with varying distances between the surfaces at various regions, and may still function as an optical resonator for various wavelengths and at various regions, suitable for use in examples discussed herein. Accordingly, the optical resonator 102 of various examples may be purposefully designed to conform to a surface, or to have various regions responsive to differing wavelengths, or responsive to differing angles of arrival for a given wavelength, in certain examples.

As illustrated in FIG. 1, the optical receiver 100 may include at least a first detector 104 and a second detector 106. The intensity-modulated first output optical signal energy is directed to the first detector 104, and the intensity-modulated second output optical signal energy is directed to the second detector 106. The first detector 104 and the second detector 106 may each include an optical-electrical converter (OEC), such as a photodetector, which in certain examples is a photodiode. While shown as physically separated detectors, in other examples, the optical receiver 100 may include one or more optical elements (e.g., mirrors) that direct the first and second output optical signal energy to the same detector or different regions within the photodetector of a single detector.

The first detector 104 converts the first output optical signal energy to a first electrical signal, and the second detector 106 converts the second output optical signal energy to a second electrical signal. In particular, each detector 104, 106 produces an amplitude modulated signal representative of the corresponding received intensity-modulated output optical signal energy. Each detector 104, 106 may detect the change in the corresponding output optical signal energy intensity (e.g., based on the amplitude modulated signals) to determine the phase, frequency, or amplitude variations (modulations) in the arriving optical signal. In particular, the detectors 104, 106 may include processing circuitry that perform various processes for interpreting peaks and troughs of such output signals. In some examples, each detector 104, 106 may include, or may send and receive data with, an analog to digital converter and a digital processing system. In these examples, the amplitude modulated signals representative of the intensity-modulated output optical signal energy may be converted to a digital form by the analog to digital converter. The digital signal may then be provided to a digital processing subsystem for digital processing.

As illustrated in FIG. 1, the circulator 108 may be positioned along the input path 116 to receive the optical signal and direct the optical signal along the input path 116 to the optical resonator 102. In one particular example, the circulator 108 is a fiber-optical circulator and the input path 116 includes an optical fiber. In various examples, the circulator 108 is a three-port circulator in which a signal (e.g., light) entering one of the three ports (P1, P2, P3) exits the circulator 108 at the next sequentially numbered port. For instance, the optical signal may be received at the circulator 108 at the first port (P1), and output and directed to the optical resonator 102 via the second port (P2).

As further shown in FIG. 1, the circulator 108 is positioned to receive the second output optical signal energy from the optical resonator 102 and direct the second output optical signal energy to the second detector 106. In particular, the circulator 108 is positioned to receive the second output optical signal energy from the optical resonator 102 along the input path 116 in a direction opposite propagation of the optical signal to the optical resonator 102. That is, the second output optical signal may propagate along the input path 116, which may include an optical fiber, in a direction opposite to the propagation of the optical signal. The circulator 108 may receive the second output optical signal energy (shown as being received at the second port) and separate the second output optical signal energy from the optical signal based on the direction of propagation. The second output optical signal energy received at the second port is output and directed to the second detector 106 via the third port (P3) of the circulator 108.

Figure 2:
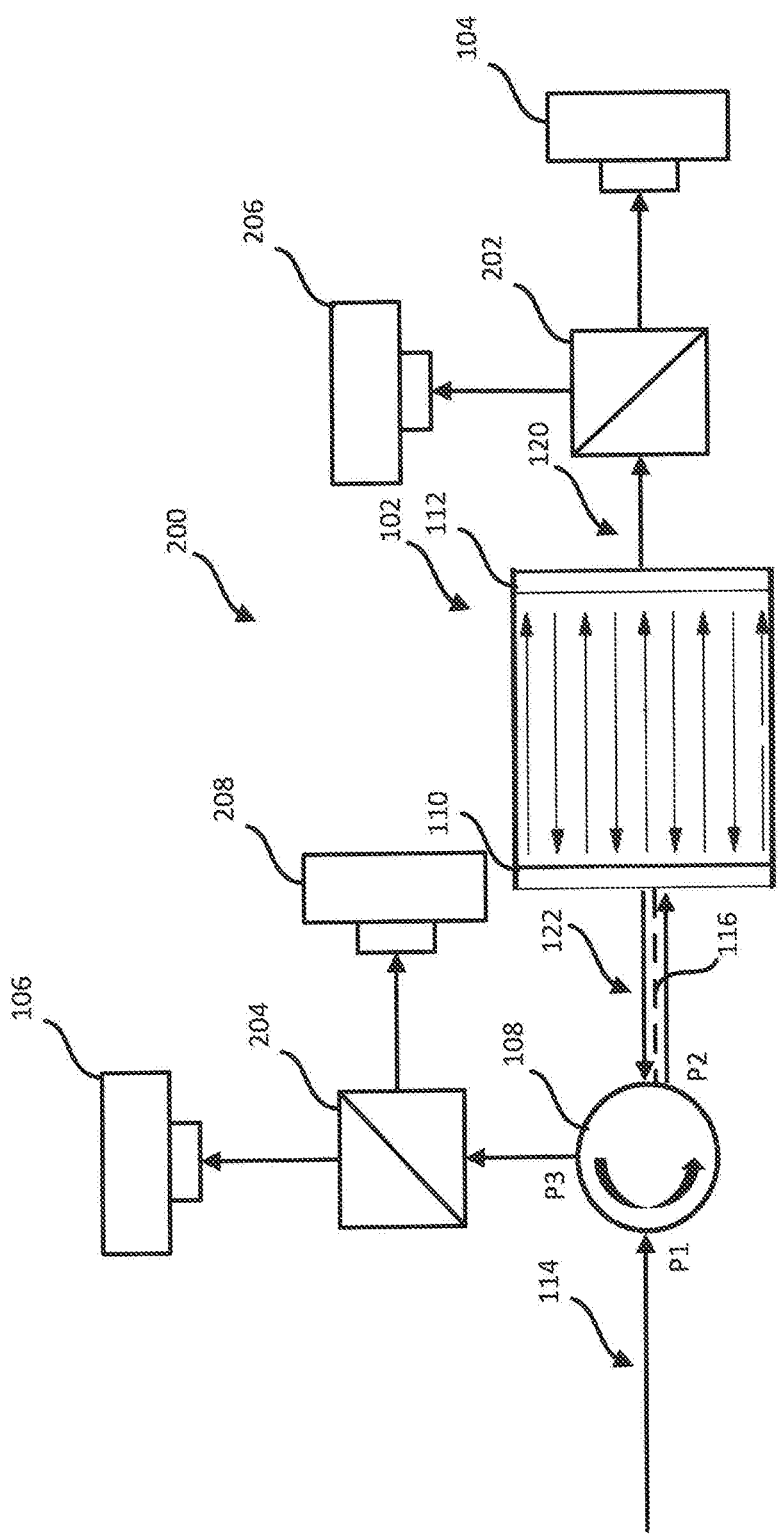
FIG. 2 is a diagram of another example of an optical receiver according to aspects of the present invention.

In various examples, the received optical signal may include information encoded in more than one polarization of the optical signal. In these situations, the optical receiver 100 may include one or more beamsplitters to separate the information encoded in each polarization. FIG. 2 illustrates one example of an optical receiver 200 including one or more beamsplitters to separate polarization components of the first output optical signal energy, and one or more beamsplitters to separate polarization components of the second output optical signal energy. FIG. 2 includes many of the same components of the optical receiver 100 illustrated in FIG. 1, such as the circulator 108, the optical resonator 102, and the first and second optical detectors 104, 106. Similar components are referred to by the same reference numbers in FIG. 2 as also shown in FIG. 1.

As illustrated in FIG. 2, the first beamsplitter 202 may be positioned between the first output (e.g., the first semi-reflective surface 112) and the first detector 104. The first beamsplitter 202 is configured to split the first output optical signal energy into a first portion having a first polarization and a second portion having a second polarization. The first and second polarizations may be orthogonal to each other, such as for instance, a vertical polarization and a horizontal polarization. As illustrated, the first beamsplitter 202 is configured to direct the first portion of the first output optical signal energy to the first detector 104 and direct the second portion of the first output optical signal energy to a third detector 206. The third detector 206 may be similar to the first detector 104 and may include an optical-electrical converter (OEC), such as a photodetector, which in certain examples is a photodiode.

Similar to the first beamsplitter 202, the second beamsplitter 204 may be configured to split the second output optical signal energy into a first portion having the first polarization and a second portion having the second polarization. As illustrated, the second beamsplitter 204 is configured to direct the first portion of the second output optical signal energy to the second detector 106 and direct the second portion of the second output optical signal energy to a fourth detector 208. The fourth detector 208 may be similar to the second detector 106 and may include an optical-electrical converter (OEC), such as a photodetector, which in certain examples is a photodiode. In various examples, the second beamsplitter 204 is interposed between the circulator 108 and the second detector 106, and further interposed between the circulator 108 and the fourth detector 208. In FIG. 2, the second beamsplitter 204 is illustrated as receiving the second output optical signal energy from the third port of the circulator 108. In certain examples in which the circulator 108 is an optical fiber circulator and the optical signal paths include optical fibers, as discussed above, the first beamsplitter 202 and/or the second beamsplitter 204 may be integrated into the respective optical fibers. In the example shown in FIG. 2, the first and second beamsplitters 202, 204 are positioned to receive the first output optical signal energy and the second output optical signal energy after it propagates through the optical fiber corresponding to the input path 116; however, in other examples, one or more beamsplitters may instead be positioned to split the optical signals before they enter the optical fiber. As will be appreciated by those skilled in the art, given the benefit of this disclosure, several variations in the arrangement of the detector(s) and beamsplitter(s) may be implemented to achieve equivalent results.

In various examples, the first beamsplitter 202 and the second beamsplitter 204 may each be a polarization beamsplitter, as discussed above. However, in other examples, the first and second beamsplitters 202, 204 need not be polarizing beamsplitters, and may simply be used to direct portions of the first and second output optical signal energies to various detectors. For example, the first and second beamsplitters 202, 204 may divide the first output optical signal energy and the second output optical signal energy based on a percentage of the light, such as an 80/20 split, a 70/30 split, a 50/50 split, etc.

In FIG. 2, the first beamsplitter 202 is shown as transmitting the first portion of the first output optical signal energy and reflecting the second portion of the first output optical signal energy. Similarly, the second beamsplitter 204 is shown in FIG. 2 as transmitting the first portion of the second output optical signal energy and reflecting the second portion of the second output optical signal energy. It is appreciated that in various other examples, the reflection and transmission functionality of each beamsplitter 202, 204 may be switched. That is, instead of transmitting a portion of the first or second output optical signal energy, the corresponding beamsplitter 202, 204 may instead reflect a portion of the first or second output optical signal energy, and instead of reflecting a portion of the first or second output optical signal energy, the corresponding beamsplitter 202, 204 may instead transmit a portion of the first or second output optical signal energy.

Accordingly, the first and second beamsplitters 202, 204 allow the optical receiver 200 to operate on orthogonal polarizations of the received optical signal simultaneously. Since the two polarizations are orthogonal, the corresponding information is non-interfering and may be demodulated independently and according to the techniques described herein. In some examples, the principle axis of the received optical signal is not aligned with an orientation of the first beamsplitter 202 and/or not aligned with an orientation of the second beamsplitter 204. As a result, each of the detectors 104, 106, 206, 208 may receive a portion of both polarization components of the received optical signal.

Figure 3:
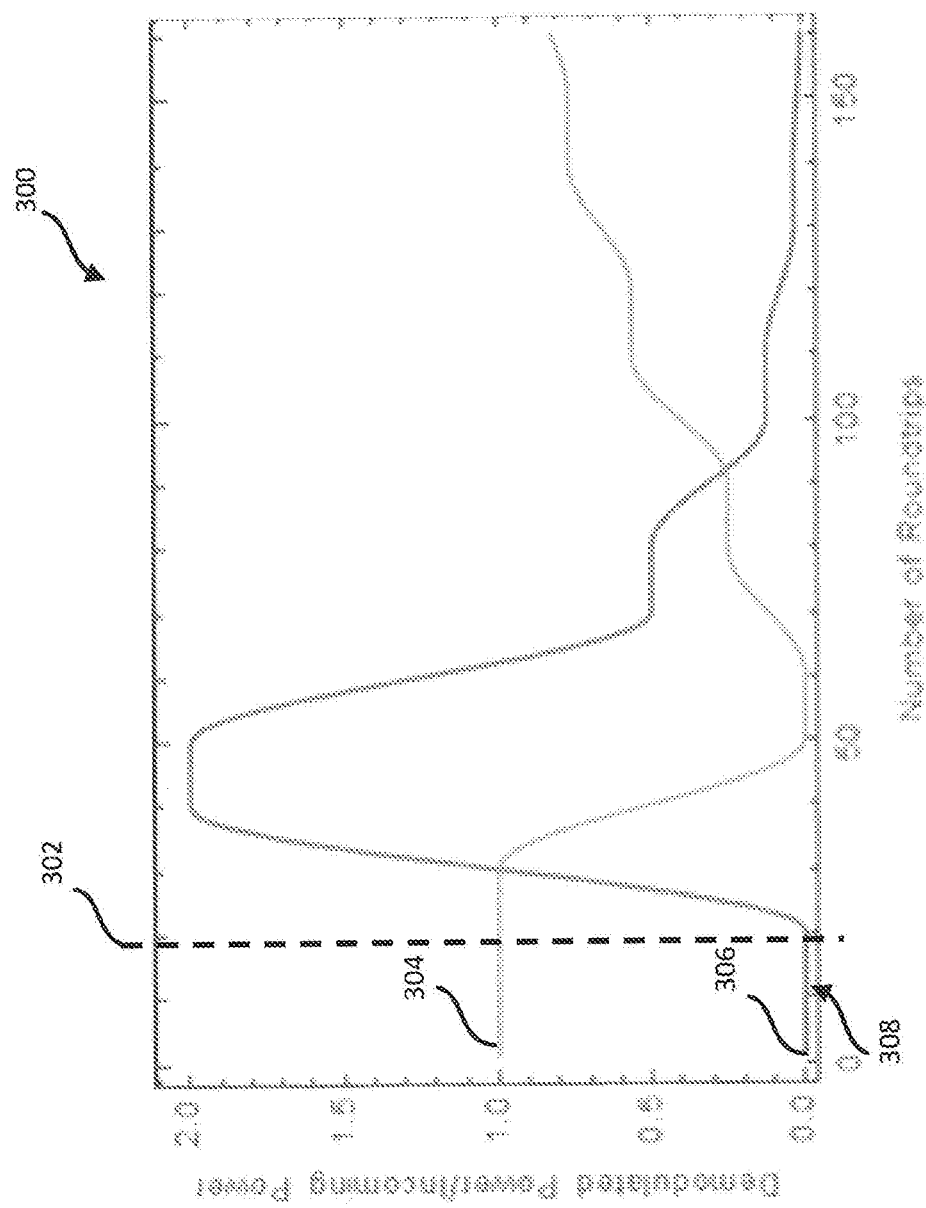
FIG. 3 is a graph showing an example of an output power plot of transmitted output optical signal energy and rejected output optical signal energy emitted from an optical resonator in response to modulation of a received optical signal according to aspects of the present invention.

As previously discussed with reference to at least FIGS. 1 and 2, in various examples, the optical resonator 102 will accumulate resonant optical signal energy and coherently develop the transmitted output optical signal energy and the rejected output optical signal energy based on the received optical signal, and maintain a given intensity level of each of the transmitted output optical signal energy and the rejected output optical signal energy until a variation (e.g., a phase change) of the received optical signal occurs. When a variation occurs in the received optical signal, interference causes a dependent change in the intensity (or amplitude) of the transmitted output optical energy and the rejected output optical signal energy, as discussed above. FIG. 3 illustrates an example of an output power plot 300 of the transmitted output optical signal energy and the rejected output optical signal energy in response to a variation (e.g., phase transition) in the received optical signal. In FIG. 3, a first trace 304 represents the transmitted output optical signal energy, and a second trace 306 represents the rejected output optical signal energy. FIG. 3 is described with continuing reference to FIG. 1.

In FIG. 3, at point 308 the optical resonator 102 is in the steady-state condition where a constant intensity of the transmitted output optical signal energy emerges. While shown in FIG. 3 as being at an intensity level of 0 when the optical resonator 102 is in the steady state condition, it is appreciated that the rejected output optical signal energy may have a non-zero intensity level during the steady-state condition. At point 302 a phase transition occurs in the arriving optical signal, temporarily disrupting the steady-state and causing a change in the intensity of the transmitted output optical signal energy and a change in the intensity of the rejected output optical signal energy.

In the example shown in FIG. 3, the transmitted output optical signal energy is shown as having a decrease in intensity, and the rejected output optical signal energy is shown as having an increase in intensity. However, as discussed above, in other examples the opposite may occur. During successive reflections of the received optical signal inside the optical resonator 102, resonance is re-established, and the transmitted output optical signal energy increases (or decreases) until a steady intensity of light emerges when the optical resonator 102 has returned to the steady-state condition. Also during the successive reflections of the received optical signal inside the optical resonator 102, the rejected output optical signal energy decreases (or increases) until a steady intensity of the rejected output optical signal energy emerges.

As illustrated in FIG. 3, the intensity change in the rejected output optical signal energy may lead the intensity change in the transmitted output optical signal energy. For instance, FIG. 3 shows the increase in the trace 306 temporally occurring before the decrease in the trace 304. Accordingly, in some examples, the rejected output optical signal energy may be used as a trigger to initiate detection operations corresponding to the transmitted output optical signal energy. For instance, a detected change (e.g., increase or decrease) in the intensity of the rejected output optical signal energy may be used as a trigger for initiating detection operations of the first detector 104 illustrated in FIG. 1 and/or the first detector 104 and the third detector 206 illustrated in FIG. 2. Use of the rejected output optical signal energy as a trigger may decrease the sampling requirements and memory requirements of the corresponding receiver (e.g., optical receiver 100 or optical receiver 200). In other examples, a detected intensity change in the rejected output optical signal energy may be used to validate a detected intensity change in the transmitted output optical signal energy. For instance, the optical receivers discussed herein may correlate a variation (e.g., phase, frequency or amplitude change) in the received optical signal with a change in the intensity of the transmitted output optical signal energy only when an intensity change in the rejected output optical signal energy is also present. Such examples may help prevent the detection of false transitions in the received optical signal. In certain examples, an average value of the rejected output optical signal energy can be used as a trigger threshold for detection of the transmitted optical signal energy. Although the above-discussed examples use the rejected output optical signal energy as a trigger for detecting/measuring the transmitted output optical signal energy, in other examples, the opposite arrangement can be implemented, namely, that the transmitted output optical signal energy, or an average value thereof, may be used as a trigger or detection threshold for the detection/measurement of the rejected output optical signal energy. The average value of either the transmitted output optical signal energy or the rejected output optical signal energy may also be used to determine the tuning of the resonance condition of the optical resonator, as the resonance condition may alter with changes in the wavelength of the incoming optical signal or other changing conditions.

As discussed, in many examples, the optical receivers 100, 200 may include processing circuitry, or may be coupled to processing circuitry. While in one example, the processing circuitry may be included within one or more of the detectors 104, 106, 206, 208 illustrated in FIG. 1 or FIG. 2, in various other examples, the optical receivers 100, 200 may include communication circuitry (e.g., a transceiver) that communicates information to remote processing circuitry.

The processing circuitry may be configured to detect one or more changes in output optical signal energy intensity to determine the phase, frequency, or amplitude variations (modulations) in the arriving optical signal. The processing circuitry may be signal processing circuitry, and may be implemented with one or more specialized hardware components or one or more specialized software components. For instance, the processing circuitry may be implemented as one of, or a combination of, analog circuitry or digital circuitry. The processing circuitry may be composed of an array of logic blocks arranged to perform one or more of the corresponding signal processing operations described herein. In particular, the processing circuitry may be implemented by an array of transistors arranged in an integrated circuit that provides a performance and power consumption similar to an ASIC (application-specific integrated circuit) or an FPGA (field-programmable gate array). In other examples, components of the processing circuitry may be implemented as one or more microprocessors executing software instructions (e.g., predefined routines). In particular, the software instructions may include digital signal processing (DSP) instructions. One example of a processing system for executing such predefined routines is described herein with reference to FIG. 4.

Figure 4:
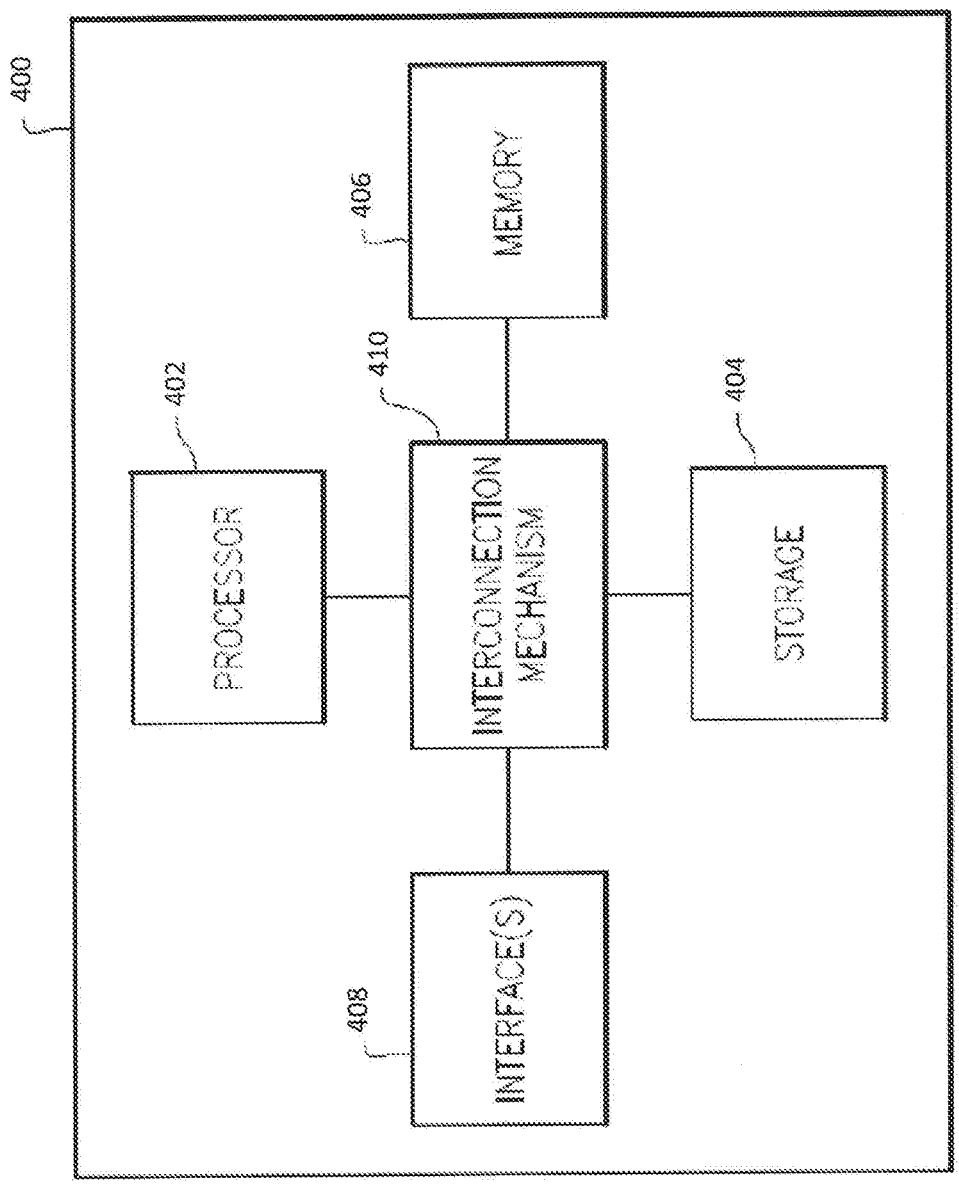
FIG. 4 is a functional block diagram of one example of a processing system that may be used in an optical receiver according to aspects of the present invention.

FIG. 4 illustrates one example of a processing system 400 that may be included within the optical receiver 100 illustrated in FIG. 1, or the optical receiver 200 illustrated in FIG. 2. The processing system 400 may include a processor 402, data storage 404, a memory 406, and one or more interfaces 408, such as a system interface and/or a user interface. While not explicitly illustrated in FIG. 4, in certain examples the processing system 400 may be coupled to a power source. The power source may deliver power to one or more components of the processing system 400, as well as other components of the optical receiver 100.

In FIG. 4, the processor 402 is coupled to the data storage 404, memory 406, and the various interfaces 408. The memory 406 stores programs (e.g., sequences of instructions coded to be executable by the processor 402) and data during operation of the processing system 400. Thus, the memory 406 may be a relatively high performance, volatile, random access memory such as a dynamic random access memory ("DRAM") or static memory ("SRAM"). However, the memory 406 may include any device for storing data, such as a disk drive or other nonvolatile storage device. Various examples may organize the memory 406 into particularized and, in some cases, unique structures to perform the functions disclosed herein. These data structures may be sized and organized to store values for particular data and types of data.

The data storage 404 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 402 to perform any of the functions described herein.

In various examples, the processing system 400 includes several interface components 408, such as a system interface and/or a user interface. Each of the interface components 408 is configured to exchange, e.g., send or receive, data with other components of the processing system 400 (and/or associated transmitter or receiver), or other devices in communication with the processing system 400. According to various examples, the interface components 408 may include hardware components, software components, or a combination of hardware and software components. In certain examples, components of the system interface couples the processor 402 to one or more other components of the optical receiver 100 shown in FIG. 1. The system interface may provide one or more control signals to any such components and may manage the operation of such components, as described above.

A user interface may include hardware and/or software components that allow a corresponding optical receiver in which the processing system 400 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the processing system 400. Data received at the various interfaces may be provided to the processor 402, as illustrated in FIG. 4. Communication coupling (e.g., shown interconnection mechanism 410) between the processor 402, memory 406, data storage 404, and interface(s) 408 may be implemented as one or more physical busses in conformance with standard, proprietary, or specialized computing bus technologies.

The processor 402 performs a series of routines (e.g., digital signal processing instructions) that result in manipulated data that is stored in and retrieved from the data storage 404, as discussed above. In various examples, the series of instructions result in interpretation of the outputs from an optical resonator, as discussed above. Such instructions may correspond to commands for interpreting peaks and troughs of such output signals to determine symbol transitions, and recovering information therefrom.

The processor 402 may be any type of processor, multi-processor or controller. For instance, the processor may include a processor manufactured by INTEL, AMD, MOTOROLA, or FREESCALE. In some examples, the processor 402 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Examples of specific implementations are provided herein for illustrative purposes only and are not intended to be limiting. Accordingly, the foregoing description and drawings are by way of example only, and the scope of the invention should be determined from proper construction of the appended claims, and their equivalents.

What is claimed is:

1. An optical receiver comprising:
   an optical resonator having first and second outputs and configured to receive an optical signal, to accumulate resonant optical signal energy, and to emit first output optical signal energy from the first output and second output optical signal energy from the second output, wherein in response to a variation in the received optical signal corresponding to a modulation of the optical signal, the optical resonator is configured to disrupt the first output optical signal energy and the second output optical signal energy to convert the modulation of the optical signal into an intensity modulation of the first output optical signal energy and the second output optical signal energy;
   a first detector positioned to receive the first output optical signal energy and detect the intensity modulation of the first output optical signal energy;
   a second detector positioned to receive the second output optical signal energy and detect the intensity modulation of the second output optical signal energy;
   a third detector; and
   a first beamsplitter interposed between the first output and the first detector and between the first output and the third detector, wherein the first beamsplitter is configured to split the first output optical signal energy into a first portion and a second portion, and wherein the first beamsplitter is configured to direct the first portion of the first output optical signal energy to the first detector and direct the second portion of the first output optical signal energy to the third detector.

2. The optical receive of claim 1, wherein the optical receiver further comprises a circulator positioned to direct the optical signal along an input path to the optical resonator, the circulator being further positioned and configured to receive the second output optical signal energy from the optical resonator along the input path in a direction opposite to propagation of the optical signal and to direct the second output optical signal energy to the second detector.

3. The optical receiver of claim 2, wherein the circulator is an optical fiber circulator and the input path is an optical fiber.

4. The optical receiver of claim 1 wherein the optical signal is a frequency-modulated optical signal, and wherein the variation corresponds to a frequency change in the optical signal.

5. The optical receiver of claim 1, wherein the optical resonator includes a first semi-reflective surface and a second semi-reflective surface configured to accumulate the resonant optical signal energy by reflecting at least a portion of the optical signal between the first and second semi-reflective surfaces.

6. The optical receiver of claim 5, wherein the first output is the first semi-reflective surface and the second output is the second semi-reflective surface.

7. The optical receiver of claim 1, further comprising:
   a fourth detector; and
   a second beamsplitter interposed between the second output and the second detector and between the second output and the fourth detector, wherein the second beamsplitter is configured to split the second output optical signal energy into a first portion and a second portion, and wherein the second beamsplitter is configured to direct the first portion of the second output optical signal energy to the second detector and direct the second portion of the second output optical signal energy to the fourth detector.

8. The optical receiver of claim 7, wherein the optical receiver further comprises a circulator positioned to direct the optical signal along an input path to the optical resonator, the circulator being further positioned and configured to receive the second output optical signal energy from the optical resonator and to direct the second output optical signal energy to the second beamsplitter.

9. The optical receiver of claim 7, wherein the first portion of the first output optical signal energy has a first polarization, the second portion of the first output optical signal energy has a second polarization orthogonal to the first polarization, the first portion of the second output optical signal energy has the first polarization, and the second portion of the second output optical signal energy has the second polarization.

10. The optical receiver of claim 1, wherein the first portion of the first output optical signal energy has a first polarization, and the second portion of the first output optical signal energy has a second polarization orthogonal to the first polarization.

11. The optical receiver of claim 1, wherein the optical signal is a phase-modulated optical signal, and wherein the variation corresponds to a phase change in the optical signal.

12. An optical receiver comprising:
    an optical resonator having first and second outputs and configured to receive an optical signal, to accumulate resonant optical signal energy, and to emit first output optical signal energy from the first output and second output optical signal energy from the second output, wherein in response to a variation in the received optical signal corresponding to a modulation of the optical signal, the optical resonator is configured to disrupt the first output optical signal energy and the second output optical signal energy to convert the modulation of the optical signal into an intensity modulation of the first output optical signal energy and the second output optical signal energy;
    a first detector positioned to receive the first output optical signal energy and detect the intensity modulation of the first output optical signal energy, the first detector configured to use an average value of the second output optical signal energy as a trigger threshold for detection of the intensity modulation of the first output optical signal energy; and
    a second detector positioned to receive the second output optical signal energy and detect the intensity modulation of the second output optical signal energy.

13. A method of operating an optical signal receiver, the method comprising:
    receiving an optical signal at an optical resonator;

accumulating resonant optical signal energy within the optical resonator;

emitting first output optical signal energy from a first output of the optical resonator;

emitting second output optical signal energy from a second output of the optical resonator;

in response to a variation in the received optical signal corresponding to a modulation of the optical signal, disrupting the first output optical signal energy and the second output optical signal energy to convert the modulation of the optical signal into an intensity modulation of the first output optical signal energy and the second output optical signal energy;

receiving the first output optical signal energy at a first detector, and detecting the intensity modulation of the first output optical signal energy;

receiving the second output optical signal energy at a second detector and detecting the intensity modulation of the second output optical signal energy;

splitting, at a first beamsplitter, the first output optical signal energy into a first portion having a first polarization and a second portion having a second polarization orthogonal to the first polarization;

directing the first portion of the first output optical signal energy to the first detector; and directing the second portion of the first output optical signal energy to a third detector.

14. The method of claim 13, further comprising:

directing the optical signal along an input path to the optical resonator with a circulator;

receiving the second output optical signal energy from the optical resonator at the circulator along the input path in a direction opposite to propagation of the optical signal; and directing the second output optical signal energy to the second detector with the circulator.

15. The method of claim 13, wherein accumulating the resonant optical signal energy within the optical resonator includes reflecting at least a portion of the optical signal between a first semi-reflective surface and a second semi-reflective surface.

16. The method of claim 13, further comprising:

at a second beamsplitter, splitting the second output optical signal energy into a first portion having the first polarization and a second portion having the second polarization;

directing the first portion of the second output optical signal energy to the second detector; and directing the second portion of the second output optical signal energy to a fourth detector.

17. The method of claim 16, further comprising:

directing the optical signal along an input path to the optical resonator with a circulator;

receiving the second output optical signal energy from the optical resonator at the circulator; and directing the second output optical signal energy to the second beamsplitter with the circulator.

18. The method of claim 13, wherein the optical signal is one of a phase-modulated optical signal, a frequency-modulated optical signal, and an amplitude-modulated optical signal, and wherein the variation corresponds to a respective phase change, frequency change, or amplitude change in the optical signal.

* * * * *